(No Model.)
C. B. HOOD.
COMBINED SEED PLANTER AND GUANO DISTRIBUTER.
No. 326,740. Patented Sept. 22, 1885.
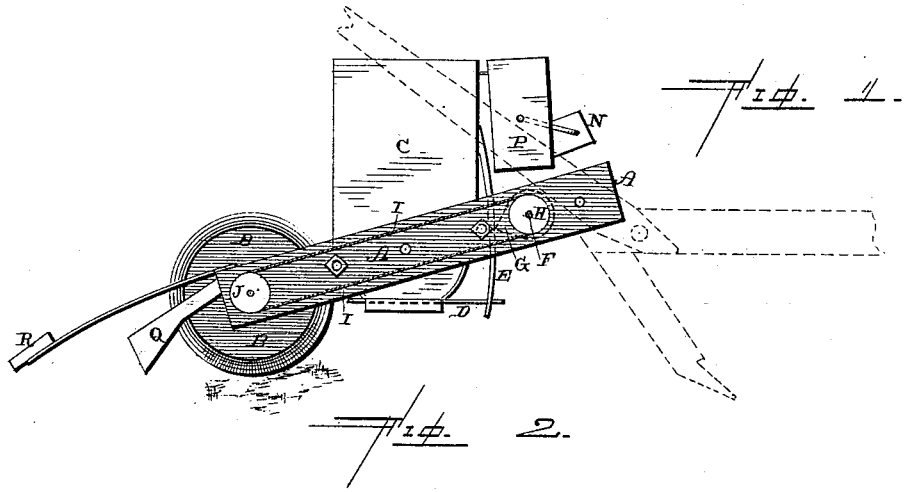
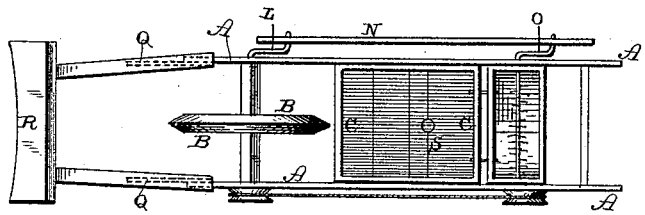
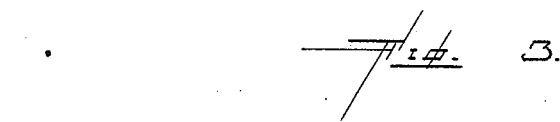
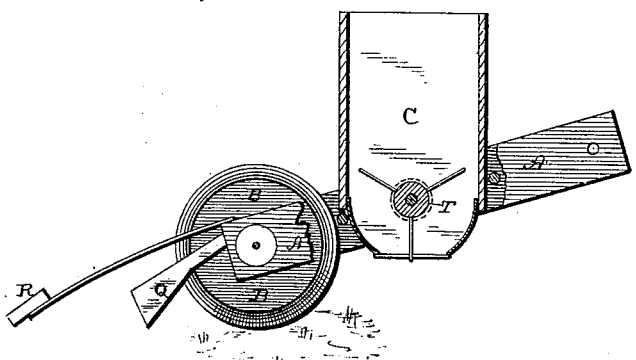
Witnesses
X. F. Gardner
L. L. Burket
Inventor
C. B. Hood,
per F. A. Lehmann,
Atty.

United States Patent Office.

CALVINE B. HOOD, OF KOSSE, TEXAS.

COMBINED SEED-PLANTER AND GUANO-DISTRIBUTER.

SPECIFICATION forming part of Letters Patent No. 326,740, dated September 22, 1885.

Application filed July 13, 1885. (No model.)

*To all whom it may concern:*

Be it known that I, CALVINE B. HOOD, of Kosse, in the county of Limestone and State of Texas, have invented certain new and useful Improvements in Combined Seed - Planters and Guano-Distributers; and I do hereby declare the following to be a full, clear, and exact description of the invention, such as will enable others skilled in the art to which it pertains to make and use it, reference being had to the accompanying drawings, which form part of this specification.

My invention relates to an improvement in combined seed and guano distributers; and it consists in the combination and arrangement of parts, which will be more fully described hereinafter, whereby the machine can be readily attached to and removed from a cultivator of any suitable description and used for planting seeds of different kinds and distributing guano at the same time that the seeds are being planted.

Figure 1 is a side elevation of a machine, showing it adapted for planting grain and distributing guano. Fig. 2 is a plan view of the same. Fig. 3 is a vertical longitudinal section showing the machine adapted for planting cotton-seed.

A represents the two side bars which are to be connected to a cultivator or plow, and which have journaled between their rear ends an operating-wheel, B, which runs along upon the ground and operates the planting mechanism. In between the sides of the two bars A is rigidly secured the seed-box C, which may be of any desired construction. When corn is being planted, a slide, D, is passed through the bottom of the box, and this slide is connected at its front end to a spring, E, which serves to return the slide to position after having been removed. Passing through the side pieces, A, in front of the box C, is the shaft F, and on this shaft is placed the cam G, which, as the shaft is made to revolve, strikes against the outer side of the spring E, and forces it toward the seed-box. On the outer end of this shaft F is placed a pulley, H, around which passes the endless cord, belt, or chain I, which is operated by means of the pulley J on the shaft of the wheel B. As the machine is drawn along, the wheel B is made to constantly revolve, and in revolving operates the cam G, and this cam in turn operates a spring-actuated slide, D.

For the purpose of dropping the guano directly in the furrow formed by the openers, there is secured to one end of the shaft of the wheel B a crank, L, and to this crank is attached a connecting-rod, N. This connecting-rod has its front end connected to a crank, O, which passes through the box P for holding guano. This box is hung upon the front edge of the seed-box C, and carries guano, which is kept from clogging by means of suitable arms or stirrers, which are secured to the shaft on which the crank O is formed at one end.

Secured to the rear end of the rods or bars A are the two covering devices Q, which cover the seeds over as rapidly as they are dropped. Also secured to the rear ends of the rods or bars A is the spring-actuated covering-board R, which serves to press the earth down over the tops of the seeds as rapidly as they are dropped and covered. The seeds are dropped from the bottom of the box C, either directly into the furrow by means of a tube or conveyer of any suitable kind, while the guano from the box P is conveyed into the furrow by means of a suitable tube.

When it is desired to plant cotton-seed, the slide D and the bottom S of the box C are removed, and the dropping device T is then placed in the bottom of the box C upon a shaft which has a pulley formed upon one end. The operating cord, chain, or belt I is then shortened, so as to operate this device T instead of the cam C.

The bottom of the box C, when the device T is being used, is formed by two slotted metallic plates, which can be adjusted within any desired relation to each other, according to the amount of seed it is desired that the arm on the device T shall force into the furrow.

The guano-distributer may be used at the same time that the cotton-seeds are being sowed, or it may be removed entirely, if so desired.

Having thus described my invention, I claim—

The combination of the side bars, A, which are secured to a plow or cultivator, the operating-wheel B, the seed-box C, the belt or chain I, the cam G, and the spring-actuated slide, with the cranks, the connecting-rod N, and the guano-box P, substantially as shown and described.

In testimony whereof I affix my signature in presence of two witnesses.

CALVINE B. HOOD.

Witnesses:
JEFFERSON D. HOOD,
ANDREW J. COX.